United States Patent [19]

Hira et al.

[11] 4,342,842
[45] Aug. 3, 1982

[54] PROCESS FOR PRODUCING RIGID POLYURETHANE FOAM

[75] Inventors: Yasuo Hira, Fujisawa; Susumu Tsuzuku, Tokyo; Masao Gotoh, Yokosuka; Hitoshi Yokono, Yokohama; Hiroshi Kaneko, Yokohama; Yoshihisa Hosoe, Yokohama, all of Japan

[73] Assignee: Hitachi, Ltd., Tokyo, Japan

[21] Appl. No.: 280,210

[22] Filed: Jul. 6, 1981

[30] Foreign Application Priority Data

Jul. 7, 1980 [JP] Japan .................................. 55/91758

[51] Int. Cl.$^3$ ............................................. C08G 18/14
[52] U.S. Cl. ................................................... 521/167
[58] Field of Search ........................................ 521/167

[56] References Cited

U.S. PATENT DOCUMENTS 3,597,371 8/1971 United Kingdom ................. 521/167

Primary Examiner—Maurice J. Welsh
Attorney, Agent, or Firm—Craig and Antonelli

[57] ABSTRACT

Rigid polyurethane foams having excellent heat resistance and impact resistance can be produced with good workability due to good flow properties by using a composition comprising a polyol, a polyisocyanate, a blowing agent and a reaction accelerator as essential component, characterized by using as the polyol, a mixture of (a) an alkylene oxide adduct of 4,4'-diaminodiphenylmethane having OH value of 280–600 mg KOH/g, (b) an aliphatic polyether having a hdyroxyl value of 450–800 mg KOH/g and 3 or 4 hydroxyl groups in the molecule, and (c) a polyether having a hydroxyl value of 30 to 100 mg KOH/g and 2 or 3 hydroxyl groups in the molecule, in limited amounts.

14 Claims, 1 Drawing Figure

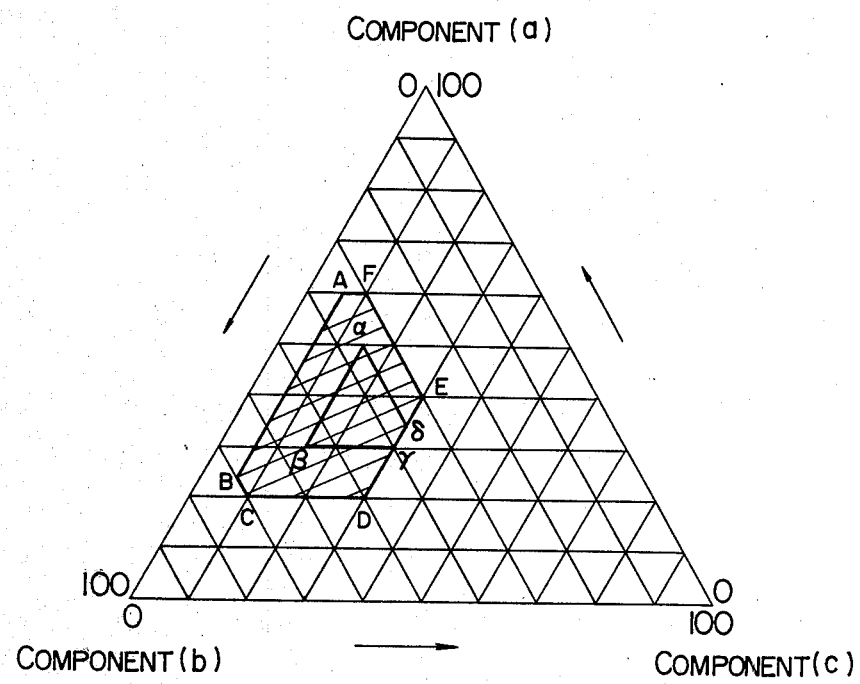

PROCESS FOR PRODUCING RIGID POLYURETHANE FOAM

BACKGROUND OF THE INVENTION

1. Field of the Invention

This invention relates to a process for producing a polyurethane foam, more particularly to a process for producing a rigid polyurethane form by a one-shot process and a composition used for producing such a polyurethane form.

2. Description of the Prior Art

Polyurethane forms are produced by using a polyol, a polyisocyanate, a blowing agent and a reaction accelerator in a open vessel. In order to produce a rigid polyurethane foam having excellent heat resistance by this process, there is used as polyol an alkylene oxide adduct of 4,4'-diaminodiphenylmethane. But when a rigid polyurethane foam is produced by using the above-mentioned compound as polyol, the resulting polyurethane foam has a defect of haivng poor impact resistance. Further, when the above-mentioned compound is used as polyol by employing the one-shot process in a closed vessel, no sufficient rigid polyurethane foam is produced due to poor flow properties.

SUMMARY OF THE INVENTION

It is an object of this invention to provide a process for producing a rigid polyurethane foam excellent in workability due to good flow properties, heat resistance and impact resistance by the one-shot process overcoming the defects of the prior art techniques and a composition used for producing such a polyurethane foam.

The above-mentioned object can be attained by improving flow properties at the time of molding by using a special low viscosity polyol and by improving impact resistance by providing flexibility to the molded article by using a special long-chain polyol, without damaging the effect of improving heat resistance of the alkylene oxide adduct of 4,4'-diaminodiphenylmethane.

More in detail, the above-mentioned object can be attained by using together with a polyisocyanate, a blowing agent, a reaction accelerator and the like additives, as polyol a mixture of the following components (a) to (c):

(a) an alkylene oxide adduct of 4,4'-diaminodiphenylmethane having an OH (hydroxyl) value of 280–600 mg KOH/g and having the following formula:

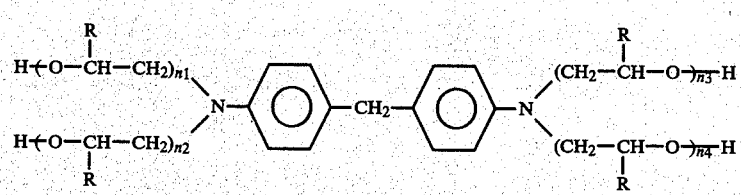

wherein R is H or $CH_3$; and $3 \leq n_1 + n_2 + n_3 + n_4 \leq 15$, (b) an aliphatic polyol having an OH value of 450–800 mg KOH/g and 3 or 4 OH groups in the molecule, and (c) a polyol having an OH value of 30 to 100 mg KOH/g and 2 or 3 OH groups in the molecule, the proportions of these components (a) to (c) being in the closed area of A-B-C-D-E-F-A, preferably α-β-γ-δ-α in the accompanying triangular diagram, wherein the points A to F and α to δ have the following compositions in percents by weight:

| Points | Component (a) | Component (b) | Component (c) |
|---|---|---|---|
| A | 60 | 35 | 5 |
| B | 25 | 70 | 5 |
| C | 20 | 70 | 10 |
| D | 20 | 50 | 30 |
| E | 40 | 30 | 30 |
| F | 60 | 30 | 10 |
| α | 50 | 35 | 15 |
| β | 30 | 55 | 15 |
| γ | 30 | 40 | 30 |
| δ | 35 | 35 | 30 |

BRIEF DESCRIPTION OF THE DRAWING

The accompanying drawing is a triangular diagram showing mixing proportions of the components (a) to (c) defined by closed area of A-B-C-D-E-F-A, or preferably defined by closed area of α-β-γ-δ-α.

DETAILED DESCRIPTION OF THE PREFERRED EMBODIMENTS

The component (a) should have an OH value of 280–600 mg KOH/g. If the OH value is larger than 600 mg KOH/g, the flow properties are lowered, while if the OH value is less than 280 mg KOH/g, heat resistance of the resulting foam is lowered. The component (b) should have an OH value of 450–800 mg KOH/g. If the OH value is larger than 800 mg KOH/g, impact resistance of the resulting foam is lowered, while if the OH value is less than 450 mg KOH/g, heat resistance of the resulting foam is lowered. The component (c) should have an OH value of 30–100 mg KOH/g. If the OH value is larger than 100 mg KOH/g, impact resistance of the resulting foam is lowered, while if the OH value is less than 30 mg KOH/g, heat resistance of the resulting foam is lowered.

The polyols of the component (a) can be produced by adding an alkylene oxide such as propylene oxide, ethylene oxide, or the like to 4,4'-diaminodiphenylmethane in the presence of an acid or alkali catalyst. The polyols of the component (a) can be used alone or as a mixture thereof. The OH value of said polyol can be changed by controlling the adding amount of alkylene oxide such as ethylene oxide or propylene oxide at the time of the synthesis.

The polyols of the component (b) include alkylene oxide (e.g., ethylene oxide, propylene oxide, etc.,) adducts of aliphatic alcohols having 3 or 4 hydroxyl groups in the molecule such as glycerin, diglycerin, pentaerythritol, trimethylolpropane, and the like; alkylene oxide (e.g., ethylene oxide, propylee oxide, etc.,) adducts of aliphatic amines, such as ethylenediamine, monoethanolamine, diethanolamine, triethanolamine, etc. These polyols of the component (b) can be used alone or as a mixture thereof. The OH value of said polyol can be changed by controlling the adding amount of the alkylene oxide at the time of synthesis as in the case of the component (a).

The polyols of the component (c) include alkylene oxide (e.g., ethylene oxide, propylene oxide, etc.,) adducts of compounds having 2 or 3 active hydrogens in the molecule such as alcohols, e.g. glycerin, ethylene glycol, propylene glycol, trimethylolpropane, bisphenol A, bisphenol F, etc.; amines, e.g. monoethanolamine, diethanolamine, triethanolamine, etc.; and water. These polyols of the component (c) can be used alone or as a mixture thereof. The OH value of said polyol can be changed to a desired value by adjusting the adding amount of alkylene oxide such as propylene oxide, ethylene oxide to the above-mentioned initiator (the compound having active hydrogen) at the time of synthesis as in the case of the component (a).

The polyol mixture containing the components (a) to (c) used in this invention can be obtained by mixing individual components (a) to (c) synthesized separately at the time of use. The polyol mixture can also be obtained by mixing a polyol mixture containing the components (a) and (b) which is synthesized at a time by adding an alkylene oxide such as ethylene oxide or propylene oxide to a mixture, for example, of anilineformaldehyde condensate and glycerin, with another polyol component (c). The important thing is that the polyol mixture should have the components (a) to (c) in the range defined by the closed area of A-B-C-D-E-F-A, more preferably the closed area of $\alpha$-$\beta$-$\gamma$-$\delta$-$\alpha$, at the time of use and the production method thereof is not limited so as to give the desired rigid polyurethane foams.

As the polyisocyanate, diisocyanates can preferably be used but trifunctional or higher polyfunctional polyisocyanates can also be used alone or as a mixture thereof. Examples of the polyisocyanates are hexamethylene diisocyanate, tolylene diisocyanate (TDI), crude TDI, 4,4'-diphenylmethane diisocyanate (MDI), crude MDI, isophorone diisocyanate, polyphenylenepolymethylene polyisocyanate (PAPI), and the like.

The mixing ratio of said polyisocyanate to said polyol mixture is preferably in the range of 0.95-1.30/1 in terms of isocyanate index (a measure of the isocyanate/polyol equivalent ratio).

As foam stabilizers, there can be used silicon compounds such as various alkylene oxide modified polydimethylsiloxanes, and the like, alkylene oxide modified fluorinated hydrocarbons, and the like.

As the reaction accelerator, there can be used tertiary amines such as triethylenediamine, diethanolamine, N-methylpiperadine, and the like; tin compounds such as dibutyl tin dilaurate, dibutyl tin acetate, tin octoate, and the like. The reaction accelerator is usually used in an amount of 0.5 to 7 parts by weight per 100 parts by weight of the polyol mixture. If the amount is too small, the accelerating effect is insufficient, while if the amount is too large, the reaction proceeds undesirably too fast.

Other polyols can also be used auxiliary purposes. Examples of such polyols are polyols containing phosphorus, e.g., alkylene oxide adducts of phosphoric acid and phosphoric acid esters; polyols obtained by copolymerizing a usual polyol with acrylonitrile; 1,4-polybutadiene glycol, its copolymer with acrylonitrile, its copolymer with styrene, and the like; 1,2-polybutadiene glycol, and the like.

As the blowing agent, there can be used halogenated hydrocarbons having lower boiling points (e.g. 20°–100° C.) such as trichloromonofluoromethane, dichlorodifluoromethane, methylene chloride, trichlorotrifluoroethane, tetrachlorodifluoroethane, etc., and water. The blowing agent is preferably used in an amount of 5 to 45 parts by weight per 100 parts by weight of the polyol mixture. If the amount is too small, foaming becomes insufficient, while if the amount is too large, voids are easily formed undesirably on the surface of the resulting urethane foams. Since the blowing agents having lower boiling points such as 20° to 100° C. are used, it is not necessary to heat molds for molding too high. Further, water can be used as blowing agent preferably in an amount of 0.25 to 2 parts by weight per 100 parts by weight of the polyol mixture. If the amount is too small, foaming becomes insufficient, while if the amount is too large, voids are easily formed undesirably on the surface of the resulting foams. It is also possible to use a mixture of a halogenated hydrocarbon having a low boiling point and water as blowing agent. Said mixture can be used in an amount of from 5.25 parts by weight (5 parts by weight of the halogenated hydrocarbon plus 0.25 parts by weight of water) to 47 parts by weight (45 parts by weight of the halogenated hydrocarbon plus 2 parts by weight of water) per 100 parts by weight of the polyol mixture.

As other additives, there can be used conventionally used ones such as one or more organic or inorganic fillers, pigments, dyes, fire retardants, and the like.

Rigid polyurethane foams can be produced by a one-shot process by mixing a solution A previously obtained by mixing the polyol mixture containing the components (a), (b) and (c), a blowing agent, a foam stabilizer, a reaction accelerator, and if necessary together with one or more fillers, dyes, pigments, fire retardants, auxiliary polyols, with a solution B containing mainly a polyisocyanate in a short time, and pouring the resulting mixture into a closed or open mold.

As mixing methods of the solutions A and B, there can be used a stirrer rotating at high speed, but more preferably a foaming machine of collision mixing type (8–20 MPa) (a so-called reaction injection molding machine) is used. Examples of these high pressure foaming machines available are manufactured, for example, by Maruka Kako-Sha K.K. (Japan), Toho Kikai K.K. (Japan), Cincinnati Milacron Inc. (U.S.), Battenfeld Maschinenfabriken GMBH (West Germany), Elastogran Maschinenbau (West Germany), Maschinenfabrik Hennecke GmbH (West Germany), and Krauss-Maffei AG (West Germany).

As the molds, there can be used those made of metals such as aluminum, iron, or the like; those made from resins such as silicone rubber, epoxy resin, and the like; and those made of wood, etc. When a closed type mold made of or from any material is used, there can be produced foams having tough surface.

This invention is illustrated by way of the following Examples, wherein all percents and parts are by weight unless otherwise specified.

EXAMPLE 1

A solution A was produced by mixing 60 parts of propylene oxide (PO) adduct of 4,4'-diaminodiphenylmethane (OH value: 380 mg KOH/g), 35 parts of PO adduct of glycerin (OH value: 680 mg KOH/g), 5 parts of propylene oxide (PO) and ethylene oxide (EO) adduct of glycerin (OH value: 60 mg KOH/g, EO:-

PO=1:2 in molar ratio), 1 part of alkylene oxide modified polydimethylsiloxane, 2.0 parts of triethylenediamine, 3.0 parts of diethanolamine, 8 parts of trichloromonofluoromethane and 0.5 part of water. A rigid polyurethane foam was produced by using the solution A and a solution B containing crude MDI (the NCO content: 31.5%) as shown in Table 1.

Molding conditions were listed in Table 2, i.e., the temperature of the solution A was 300° C., that of the solution B 250° C., the mold temperature 400° C., the collision pressure of the solutions A and B was 20 MPa, the charging amount of the mixed solutions A and B was 1440 g, which was poured into a mold in 2 seconds.

The mold used was made of iron having inner dimensions of 600×400×10 mm and had two openings for releasing gas of 0.1 mm deep and 30 mm wide at the inlet of the mixed solution and the opposite portion of the inlet.

Mixing of the solutions A and B was good and the resulting mixed solution showed good flow properties. The resulting foam had highly uniform surface density. Various properties of the resulting foam were listed in Table 2. As is clear from Table 2, the foam showed good mechanical properties, e.g., density as a whole 600 kg/m3, Izod impact strength 15 kg·cm/cm$^2$, glass transition point (a temperature at which heat absorption begins measured by using a differential calorimeter) 125° C., bending strength 42 MPa, and good heat resistance.

EXAMPLES 2 TO 8

Rigid polyurethane foams were produced by using the composition as listed in Table 1 in the same manner as described in Example 1. Molding conditions and properties of the resulting foams were listed in Table 2. In each case, the mixed solution showed good flow properties. The resulting foams showed highly uniform surface density. Further, as is clear from Table 2, these foams show good values in Izod impact strength, glass transition points and bending strength.

TABLE 1

| Solution | Composition (parts) | Example No. 1 | 2 | 3 | 4 | 5 | 6 | 7 | 8 |
|---|---|---|---|---|---|---|---|---|---|
| A | PO adduct of 4,4'-diaminodiphenylmethane (OH value: 380 mg KOH/g) | 60 | 40 | 28 | — | — | — | — | 37 |
|   | PO and EO adduct of 4,4'-diaminodiphenylmethane (OH value: 460 mg KOH/g, EO:PO = 2:1 in molar ratio) | — | — | — | 20 | 20 | 40 | 60 | — |
|   | PO adduct of glycerin (OH value: 680 mg KOH/g) | 35 | — | — | — | — | — | — | 46 |
|   | PO and EO adduct of triethanolamine (OH value: 700 mg KOH/g, EO:PO = 1:2 in molar ratio) | — | 52 | 64 | — | — | 32 | 30 | — |
|   | PO adduct of ethylenediamine (OH value: 540 mg KOH/g) | — | — | — | 70 | 50 | — | — | — |
|   | PO and EO adduct of glycerin (OH value: 60 mg KOH/g, EO:PO = 1:2 in molar ratio) | 5 | 8 | 8 | — | — | 28 | 10 | 17 |
|   | PO and EO adduct of propylene glycol (OH value: 52 mg KOH/g, EO:PO = 1:2 in molar ratio) | — | — | — | 10 | 31 | — | — | — |
|   | Alkylene oxide modified polydimethylsiloxane | 1.0 | 1.0 | 1.0 | 1.0 | 1.0 | 1.0 | 1.0 | 1.0 |
|   | Triethylenediamine | 2.0 | 2.0 | — | — | — | — | — | 2.0 |
|   | Diethylethanolamine | 3.0 | 3.0 | 2.0 | 2.0 | 2.0 | 2.0 | 2.0 | 3.0 |
|   | Trichloromonofluoromethane | 8 | 8 | 8 | — | — | — | — | 8 |
|   | Water | 0.5 | 0.5 | 0.5 | 1.0 | 1.0 | 1.0 | 1.0 | 0.5 |
| B | Crude MDI (NCO content: 31.5%) | 127 | 140 | 150 | 132 | 112 | 124 | 134 | 126 |

(Note)
EO = Ethylene oxide
PO = Propylene oxide
MDI = 4,4'-Diphenylmethane diisocyanate

TABLE 2

| | | | Example No. 1 | 2 | 3 | 4 | 5 | 6 | 7 | 8 |
|---|---|---|---|---|---|---|---|---|---|---|
| Molding conditions | Solution temperature (°C.) | Solution A | 30 | 30 | 30 | 30 | 30 | 30 | 30 | 30 |
| | | Solution B | 25 | 25 | 25 | 25 | 25 | 25 | 25 | 25 |
| | Mold temperature (°C.) | | 40 | 40 | 40 | 40 | 40 | 40 | 40 | 40 |
| | Collision mixing pressure (MPa) | | 20 | 20 | 20 | 20 | 20 | 20 | 20 | 20 |
| | Charging amount (Solutions A + B) (g) | | 1440 | 1200 | 960 | 1200 | 1200 | 1200 | 1200 | 840 |
| Properties | Density of foam (kg/m$^3$) | | 600 | 500 | 400 | 500 | 500 | 500 | 500 | 350 |
| | Izod impact strength (kg · cm/cm$^2$) | | 15 | 12 | 11 | 12 | 13 | 13 | 14 | 10 |
| | Glass transition point (°C.) | | 125 | 128 | 132 | 126 | 128 | 110 | 128 | 120 |
| | Bending strength (MPa) | | 42 | 30 | 28 | 29 | 29 | 30 | 30 | 25 |

TABLE 2-continued

|  | Example No. |  |  |  |  |  |  |  |
|---|---|---|---|---|---|---|---|---|
|  | 1 | 2 | 3 | 4 | 5 | 6 | 7 | 8 |
| (ASTM D 790) |  |  |  |  |  |  |  |  |

COMPARATIVE EXAMPLE 1

Using the composition as shown in Table 3, i.e., the solution A obtained by well mixing 70 parts of PO adduct of glycerin (OH value: 680 mg KOH/g), 1.0 part of alkylene oxide modified polydimethylsiloxane, 2.0 parts of triethylenediamine, 3.0 parts of diethylethanolamine, 8 parts of trichloromonofluoromethane and 0.5 part of water, and the solution B containing crude MDI (the NCO content: 31.5%), rigid polyurethane foam having a whole density of 600 kg/m³ was produced by collision mixing the solutions A and B under the same conditions as described in Example 1, charging 1440 g of the mixed solution into the same mold as used in Example 1. The mixed solution had poor flow properties and the resulting foam had poor Izod impact strength of 7.8 kg·cm/cm².

COMPARATIVE EXAMPLES 2 TO 5

Using the compositions as listed in Table 3, foams were produced by using the same mold and under the same conditions as described in Example 1.

The foam obtained in Comparative Example 2 had the same density as a whole as that of Example 3 but it had lower properties than those of Example 3, particularly poor in Izod impact strength as low as 5 kg·cm/cm².

The foam obtained in Comparative Example 3 had the same density as a whole as that of Example 5, but it had lower properties than those of Example 5, particularly poor in heat resistance, the glass transition point being as low as 900° C.

The foam obtained in Comparative Example 4 had the same density as a whole as that of Example 6, but it had lower properties than those of Example 6, particularly poor in heat resistance, the glass transition point being as low as 750° C.

The foam obtained in Comparative Example 5 had poor surface appearance, since mixing of the solutions A and B was poor and flow properties of the resulting mixture was also poorer than those of Example 7.

What is claimed is:

1. In a process for producing a polyurethane foam by a one-shot process using a composition comprising a polyol, a polyisocyanate, a blowing agent and a reaction accelerator as essential components, the improvement which comprises using as the polyol the following mixture comprising
   (a) an alkylene oxide adduct of 4,4'-diaminodiphenylmethane having a hydroxyl value of 280–600 mg KOH/g,
   (b) an aliphatic polyol having a hydroxyl value of 450–800 mg KOH/g and 3 or 4 hydroxyl groups in the molecule, and

TABLE 3

| Solution | Composition (parts) | Comparative Example No. | | | | |
|---|---|---|---|---|---|---|
|  |  | 1 | 2 | 3 | 4 | 5 |
| A | PO adduct of 4,4'-diamino diphenylmethane (OH value: 380 mg KOH/g) | 70 | 20 | — | — | — |
|  | PO and EO adduct of 4,4'-diaminodiphenylmethane (OH value: 460 mg KOH/g, EO:PO = 2:1 molar ratio) | — | — | 10 | 40 | 70 |
|  | PO adduct of glycerin (OH value: 680 mg KOH/g) | 30 | — | — | — | — |
|  | PO and EO adduct of triethanolamine (OH value: 700 mg KOH/g, EO:PO = 1:2 molar ratio) | — | 80 | — | 20 | 10 |
|  | PO adduct of ethylenediamine (OH value: 540 mg KOH/g) | — | — | 60 | — | — |
|  | PO and EO adduct of glycerin (OH value: 60 mg KOH/g, EO:PO = 1:2 molar ratio) | — | — | — | 40 | 20 |
|  | PO and EO adduct of propylene glycol (OH value: 52 mg KOH/g, EO:PO = 1:2 molar ratio) | — | — | 30 | — | — |
|  | Alkylene oxide modified polydimethylsiloxane | 1.0 | 1.0 | 1.0 | 1.0 | 1.0 |
|  | Triethylenediamine | 2.0 | — | — | — | — |
|  | Diethylethanolamine | 3.0 | 2.0 | 2.0 | 2.0 | 2.0 |
|  | Trichloromonofluoromethane | 8 | 8 | — | — | — |
|  | Water | 0.5 | 0.5 | 1.0 | 1.0 | 1.0 |
| B | Crude MDI (NCO content: 31.5%) | 128 | 170 | 114 | 100 | 113 |

(Note)
EO = Ethylene oxide
PO = Propylene oxide
MDI = 4,4'-Diphenylmethane diisocyanate (c) a polyol having a hydroxyl value of 30 to 100 mg KOH/g and 2 or 3 hydroxyl groups in the molecule, the proportions of the components (a), (b) and (c) being in the closed area of A-B-C-D-E-F-A in the accompanying triangular diagram, wherein the points A to F have the following compositions in percents by weight:

|   | Component (a) | Component (b) | Component (c) |
|---|---|---|---|
| A | 60 | 35 | 5 |
| B | 25 | 70 | 5 |
| C | 20 | 70 | 10 |
| D | 20 | 50 | 30 |
| E | 40 | 30 | 30 |
| F | 60 | 30 | 10 |

2. A process according to claim 1, wherein the component (a) is one or more compounds represented by the formula:

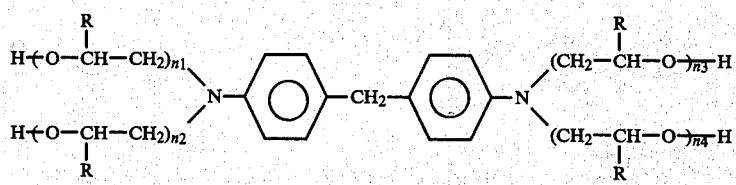

wherein R is H or CH$_3$; and $3 \leq n_1 + n_2 + n_3 + n_4 \leq 15$.

3. A process according to claim 1, wherein the component (b) is one or more aliphatic polyols obtained by adding ethylene oxide and/or propylene oxide to at least one member selected from the group consisting of glycerin, diglycerin, pentaerythritol, trimethylolpropane, monoethanolamine, diethanolamine and triethanolamine.

4. A process according to claim 1, wherein the component (c) is one or more polyols obtained by adding ethylene oxide and/or propylene oxide to at least one member selected from the group consisting of glycerin, trimethylolpropane, monoethanolamine, diethanolamine, triethanolamine, ethylene glycol, propylene glycol, bisphenol A, bisphenol F and water.

5. A process according to claim 1, wherein the polyol mixture containing the components (a) to (c) is obtained by adding an alkylene oxide to a mixture of aniline-formaldehyde condensate and glycerin to give a mixture of the components (a) and (b), followed by the addition of the component (c) thereto.

6. A process according to claim 1, wherein the mixing ratio of the polyisocyanate to the polyol is 0.95–1.3/1 in terms of isocyanate index.

7. A process according to claim 2, wherein the component (a) is produced by adding ethylene oxide and/or propylene oxide to 4,4'-diaminodiphenylmethane.

8. In a composition for producing a polyurethane foam by a one-shot process comprising
(i) one or more polyols,
(ii) one or more polyisocyanates,
(iii) one or more blowing agents, and
(iv) one or more reaction accelerator,
the improvement wherein said polyol comprising
(a) an alkylene oxide adduct of 4,4'-diaminodiphenylmethane having a hydroxyl value of 280–600 mg KOH/g,
(b) an aliphatic polyol having a hydroxyl value of 450–800 mg KOH/g and 3 or 4 hydroxyl groups in the molecule, and
(c) a polyol having a hydroxyl value of 30 to 100 mg KOH/g and 2 or 3 hydroxyl groups in the molecule, the proportions of the components (a), (b) and (c) being in the closed area of A-B-C-D-E-F-A in the accompanying triangular diagram, wherein the points A to F have the following compositions in percents by weight:

|   | Component (a) | Component (b) | Component (c) |
|---|---|---|---|
| A | 60 | 35 | 5 |
| B | 25 | 70 | 5 |
| C | 20 | 70 | 10 |
| D | 20 | 50 | 30 |
| E | 40 | 30 | 30 |
| F | 60 | 30 | 10 |

9. A composition according to claim 8, wherein the component (a) is one or more compounds represented by the formula:

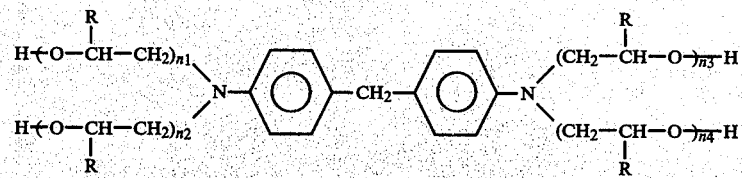

wherein R is H or CH$_3$; and $3 \leq n_1 + n_2 + n_3 + n_4 \leq 15$.

10. A composition according to claim 8, wherein the component (b) is one or more aliphatic polyols obtained by adding ethylene oxide and/or propylene oxide to at least one member selected from the group consisting of glycerin, diglycerin, pentaerythritol, trimethylolpropane, monoethanolamine, diethanolamine and triethanolamine.

11. A composition according to claim 8, wherein the component (c) is one or more polyols obtained by adding ethylene oxide and/or propylene oxide to at least one member selected from the group consisting of glycerin, trimethylolpropane, monoethanolamine, diethanolamine, triethanolamine, ethylene glycol, propylene glycol, bisphenol A, bisphenol F and water.

12. A composition according to claim 8, wherein the polyol mixture containing the components (a) to (c) is obtained by adding an alkylene oxide to a mixture of aniline-formaldehyde condensate and glycerin to give a mixture of the components (a) and (b), followed by the addition of the component (c) thereto.

13. A composition according to claim 8, wherein the mixing ratio of the polyisocyanate to the polyol is 0.95–1.3/1 in terms of isocyanate index.

14. A composition according to claim 9, wherein the component (a) is produced by adding ethylene oxide and/or propylene oxide to 4,4'-diaminodiphenylmethane.

* * * * *